US012725467B2

(12) United States Patent
Yano

(10) Patent No.: US 12,725,467 B2
(45) Date of Patent: Sep. 1, 2026

(54) VEHICLE MONITORING PROGRAM, VEHICLE-MOUNTED DEVICE, AND VEHICLE MONITORING METHOD FOR SELECTING AN ABNORMALITY PROCESS IN ACCORDANCE WITH AN ADVERSE EFFECT LEVEL

(71) Applicant: Sumitomo Electric Industries, Ltd., Osaka (JP)

(72) Inventor: Junji Yano, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 251 days.

(21) Appl. No.: 18/012,233

(22) PCT Filed: May 17, 2021

(86) PCT No.: PCT/JP2021/018609

§ 371 (c)(1),
(2) Date: Dec. 22, 2022

(87) PCT Pub. No.: WO2021/261113

PCT Pub. Date: Dec. 30, 2021

(65) Prior Publication Data

US 2023/0267776 A1 Aug. 24, 2023

(30) Foreign Application Priority Data

Jun. 25, 2020 (JP) ................................ 2020-109238

(51) Int. Cl.
*B60R 16/02* (2006.01)
*G06F 11/07* (2006.01)
*G07C 5/08* (2006.01)

(52) U.S. Cl.
CPC ......... *G07C 5/0808* (2013.01); *G07C 5/0825* (2013.01)

(58) Field of Classification Search
CPC .......................... G07C 5/0808; G07C 5/0825; B60R 16/0234; B60R 16/02; G06F 11/07
(Continued)

(56) References Cited

U.S. PATENT DOCUMENTS

2015/0317198 A1 11/2015 Kume et al.
2018/0074811 A1* 3/2018 Kiyama ................. H04L 67/12
(Continued)

FOREIGN PATENT DOCUMENTS

GB 2569112 A * 6/2019 ............. H04W 4/50
JP 2003-294129 A 10/2003
(Continued)

OTHER PUBLICATIONS

Kenneth Sharp, "There's something I downloaded that won't let me delete it because it says its a virus. How do I delete it?", 2017, Quora (Year: 2017).*
(Continued)

*Primary Examiner* — Jelani A Smith
*Assistant Examiner* — George A Alcorn, III
(74) *Attorney, Agent, or Firm* — XSENSUS LLP

(57) ABSTRACT

A vehicle monitoring program of the present disclosure is a vehicle monitoring program for use in a vehicle-mounted device to be mounted in a vehicle, the program causing a computer included in the vehicle-mounted device to function as: a monitoring unit configured to detect an abnormality of application software used in the vehicle, and an abnormality processing unit configured to, in response to the monitoring unit detecting the abnormality of the application software, select an abnormality process for a measure against the abnormality from among a plurality of abnormality processes in accordance with an adverse effect level of the application software on safe driving of the vehicle.

20 Claims, 14 Drawing Sheets

(58) Field of Classification Search
USPC .......................................................... 701/29.1
See application file for complete search history.

(56) References Cited

U.S. PATENT DOCUMENTS

| | | | | |
|---|---|---|---|---|
| 2018/0316698 | A1* | 11/2018 | David | H04L 63/0236 |
| 2019/0081958 | A1* | 3/2019 | Lee | H04L 63/145 |
| 2019/0141070 | A1* | 5/2019 | Tsurumi | B60R 16/0232 |
| 2019/0205115 | A1* | 7/2019 | Gomes | H04W 4/50 |
| 2019/0268420 | A1* | 8/2019 | Acharya | H04L 63/166 |
| 2020/0004242 | A1* | 1/2020 | Kim | B60W 30/146 |
| 2022/0083411 | A1* | 3/2022 | Knaut | G06F 8/71 |

FOREIGN PATENT DOCUMENTS

| | | | | |
|---|---|---|---|---|
| JP | 2005-332068 | A | | 12/2005 |
| JP | 2012-35663 | A | | 2/2012 |
| JP | 2012035663 | A | * | 2/2012 |
| JP | 2012-245863 | A | | 12/2012 |
| JP | 2014-115950 | A | | 6/2014 |
| JP | 2016-84050 | A | | 5/2016 |
| JP | 2016084050 | A | * | 5/2016 |
| JP | 2018-170754 | A | | 11/2018 |

OTHER PUBLICATIONS

McAfee, “What is Malware?”, Aug. 20, 2016 (Year: 2016).*

* cited by examiner

FIG. 5

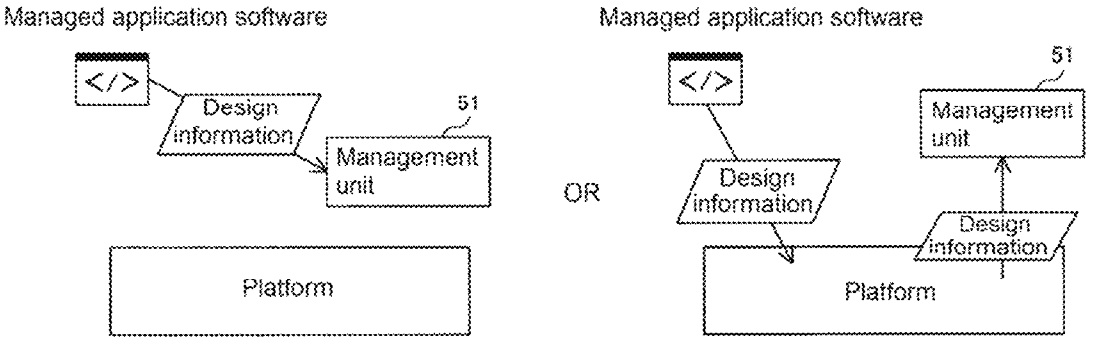

FIG. 6 tb2

| Adverse effect level | Measure at abnormality occurrence | Transition condition to emergency mode | Measure in emergency mode |
|---|---|---|---|
| 1 | ·Notify server of abnormality | ·Unable to notify server | ·Notify driver of abnormality occurrence |
| 2 | ·Notify server of abnormality<br>·Delete the application software or restore (update) | ·Unable to notify server<br>·Delete the application software or unable to restore | ·Notify driver of abnormality occurrence<br>·Instruct to move to safe place<br>·Specify and remove a cause that is an obstacle to recovery by using a virus check or the like |

VEHICLE MONITORING PROGRAM, VEHICLE-MOUNTED DEVICE, AND VEHICLE MONITORING METHOD FOR SELECTING AN ABNORMALITY PROCESS IN ACCORDANCE WITH AN ADVERSE EFFECT LEVEL

CROSS-REFERENCE TO RELATED APPLICATIONS

The present application is based on PCT/JP2021/018609, filed on May 17, 2021, which claims priority to Japanese Patent Application No. 2020-109238, filed Jun. 25, 2020, the entire contents of each are incorporated herein by reference.

TECHNICAL FIELD

The present disclosure relates to a vehicle monitoring program, a vehicle-mounted device, and a vehicle monitoring method.

BACKGROUND ART

For example, Japanese Unexamined Patent Application Publication No. 2018-170754 (PTL1) discloses the following technique as an abnormality process when abnormality occurs in a vehicle. That is, the abnormality detect ECU determines three of the current value "reverse" of the gear control information which is the data to be monitored, the past value "drive" of the gear control information which is the data to be monitored, and the current value "forward" of the speed control information which is the data to be compared as the abnormality by using the rule table. Subsequently, since the abnormality detect ECU determines the abnormality, as the vehicle protection process, the abnormality detect ECU performs a transmission prevention process of a message including the gear control information which is the data to be monitored. In addition, as the vehicle protection process, the abnormality detect ECU further instructs the outside communication device to perform an abnormality notification transmission process of transmitting information indicating the abnormality to the server.

PRIOR ART DOCUMENT

Patent Literature

PTL 1: Japanese Unexamined Patent Application Publication No. 2018-170754

SUMMARY OF INVENTION

A vehicle monitoring program of the present disclosure is a vehicle monitoring program for use in a vehicle-mounted device to be mounted in a vehicle, the program causing a computer included in the vehicle-mounted device to function as: a monitoring unit configured to detect an abnormality of application software used in the vehicle, and an abnormality processing unit configured to, in response to the monitoring unit detecting the abnormality of the application software, select an abnormality process for a measure against the abnormality from among a plurality of abnormality processes in accordance with an adverse effect level of the application software on safe driving of the vehicle.

A vehicle-mounted device of the present disclosure is a vehicle-mounted device to be mounted in a vehicle, the vehicle-mounted device includes a monitoring unit configured to detect an abnormality of application software used in the vehicle, and an abnormality processing unit configured to, in response to the monitoring unit detecting the abnormality of the application software, select an abnormality process for a measure against the abnormality from among a plurality of abnormality processes in accordance with an adverse effect level of the application software on safe driving of the vehicle.

A vehicle monitoring method of the present disclosure is a vehicle monitoring method for a vehicle-mounted device to be mounted in a vehicle, the vehicle monitoring method includes detecting an abnormality of application software used in the vehicle, and in response to the abnormality of the application software being detected, selecting an abnormality process for a measure against the abnormality from among a plurality of abnormality processes in accordance with an adverse effect level of the application software on safe driving of the vehicle.

BRIEF DESCRIPTION OF DRAWINGS

FIG. 5 is a diagram showing a method for obtaining design information by a management unit according to the embodiment of the present disclosure.

FIG. 6 is a diagram showing an example of an abnormality process by the management unit according to the embodiment of the present disclosure.

DESCRIPTION OF EMBODIMENTS

Figure 1:
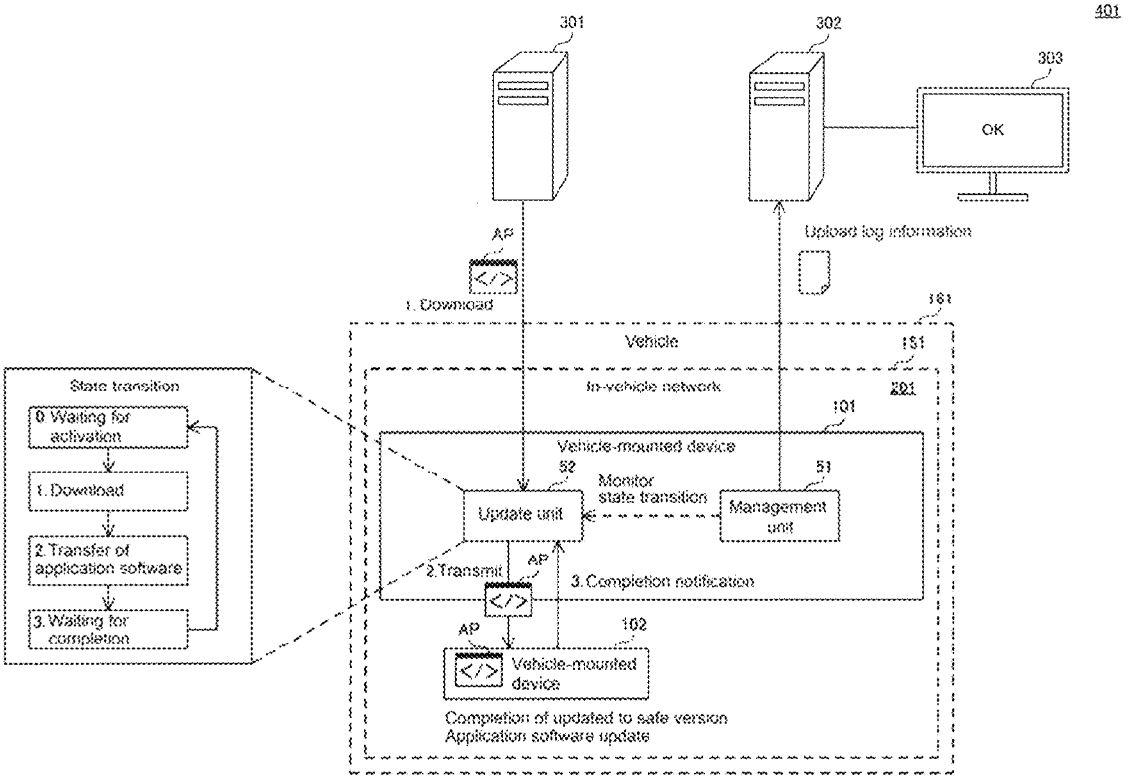
FIG. 1 is a diagram showing a configuration of a vehicle management system according to an embodiment of a present disclosure.

Problems to be Solved by Present Disclosure

In order to provide various services such as entertainment, various types of application software will be installed in vehicles. In an environment in which such various types of application software are installed, a technique for further improving safety of driving in a vehicle is desired.

The present invention has been made to solve the above-described problem, and an object thereof is to provide a vehicle monitoring program, a vehicle-mounted device, and a vehicle monitoring method capable of more effectively improving safety of driving in a vehicle in which application software is installed.

Advantageous Effects of Present Disclosure

According to the present disclosure, it is possible to more effectively improve safety of driving in a vehicle in which application software is installed.

DESCRIPTION OF EMBODIMENTS OF PRESENT DISCLOSURE

First, contents of an embodiment of the present disclosure will be listed and explained.

(1) A vehicle monitoring program according to an embodiment of the present disclosure is a vehicle monitoring program for use in a vehicle-mounted device to be mounted in a vehicle, the vehicle monitoring program causing a computer included in the vehicle-mounted device to function as: a monitoring unit configured to detect an abnormality of application software used in the vehicle, and an abnormality processing unit configured to, in response to the monitoring unit detecting the abnormality of the application software, select an abnormality process for a measure against the abnormality from among a plurality of abnormality processes in accordance with an adverse effect level of the application software on safe driving of the vehicle.

With such a configuration, when the abnormality occurs in the application software installed in the vehicle, it is possible to appropriately select an abnormality process according to how much the application software affects the safe driving of the vehicle. Therefore, it is possible to more effectively improve the safety of driving in the vehicle in which the application software is installed.

(2) The computer may be caused to function as: a determining unit configured to determine whether the application software in which the abnormality has been detected is application software that performs output to a driver of the vehicle. The abnormality processing unit may be configured to determine the adverse effect level in accordance with a determination result made by the determining unit.

With such a configuration, it is possible to perform the abnormality process focusing on not only the operation system of the vehicle but also application software that performs some output to the driver, and thus it is possible to further improve safety of driving in the vehicle.

(3) The computer may be caused to function as: a determining unit configured to determine whether the application software in which the abnormality has been detected is audio software or car navigation software. The abnormality processing unit may be configured to determine the adverse effect level in accordance with a determination result made by the determining unit.

With such a configuration, it is possible to perform an abnormality process focusing on application software that performs output of sound, light, and the like to a driver in particular, and thus it is possible to further improve safety of driving in a vehicle.

(4) The computer may be caused to function as: a determining unit configured to determine whether the application software in which the abnormality has been detected is software capable of writing data in a storage unit used by the vehicle-mounted device. The abnormality processing unit may be configured to determine the adverse effect level in accordance with a determination result made by the determining unit.

With such a configuration, it is possible to perform the abnormality process focusing on the actuator control in the vehicle and the application software capable of changing the content of the measurement result of the vehicle-mounted sensor or the like, and thus it is possible to further improve safety of driving in the vehicle.

(5) The computer may be caused to function as: a determining unit configured to determine whether the application software in which the abnormality has been detected is diagnosing software. The abnormality processing unit may be configured to determine the adverse effect level in accordance with a determination result made by the determining unit.

With such a configuration, it is possible to perform an abnormality process focusing on application software that provides unique information such as a driver of a vehicle to the outside of the vehicle, and thus it is possible to improve security of the vehicle.

(6) The application software may be associated with design information including the adverse effect level, and the abnormality processing unit may be configured to specify, based on the design information associated with the application software, the adverse effect level.

With such a configuration, an appropriate abnormality process may be performed according to the adverse effect level included in the design information of the application software, and thus it is possible to improve security of the vehicle.

(7) The abnormality processing unit may have an operation mode including a first operation mode and a second operation mode, for each combination of the adverse effect level and the operation mode, the combination is associated with the abnormality process, and the abnormality processing unit may be configured to, when operating in the first operation mode, select the abnormality process associated with a combination of the adverse effect level and the first operation mode, and, when being incapable of executing the selected abnormality process, shift from the first operation mode to the second operation mode, and select and execute the abnormality process associated with a combination of the adverse effect level and the second operation mode.

With such a configuration, for another abnormality in which an abnormality process such as notification of abnormality information to the outside of the vehicle cannot be performed, a process corresponding to the another abnormality can be performed, and a more excellent abnormality handling function can be provided in the vehicle.

(8) The abnormality process associated with the combination of the adverse effect level and the first operation mode may be a process of reporting the abnormality detected by the monitoring unit to an information processing device installed outside the vehicle, and the abnormality process associated with the combination of the adverse effect level and the second operation mode may be a process of reporting occurrence of the abnormality detected by the monitoring unit to a driver of the vehicle.

With such a configuration, when the abnormality information cannot be notified to the outside of the vehicle, it is possible to notify the driver of the occurrence of the abnormality and prompt the driver to take measures against the abnormality.

(9) The abnormality process associated with the combination of the adverse effect level and the second operation mode may be a process for the vehicle.

With such a configuration, in a case where an abnormality process such as notification of abnormality information to the outside of the vehicle cannot be performed, a process having an effective content with respect to the vehicle such as location movement can be performed.

(10) The abnormality process associated with the combination of the adverse effect level and the second operation mode may be a process of outputting a notification screen for a driver of the vehicle.

In this manner, by the configuration in which the notification to the driver of the vehicle is performed in a case where another abnormality in which the abnormality process cannot be performed, such as the notification of the abnormality information to the outside of the vehicle, occurs, it is possible to limit the notification opportunity to the driver of the vehicle to some extent and to improve the comfort of driving of the driver.

(11) The notification screen may be a screen prompting a movement of the vehicle.

With such a configuration, in a case where another abnormality in which the abnormality process cannot be performed, such as the notification of the abnormality information to the outside of the vehicle occurs, for example, it is possible to notify the driver that the vehicle moves to a safe place. Therefore, it is possible to further improve safety of driving in the vehicle while improving comfort of driving of the driver.

(12) The notification screen may be a screen including a route guide to a facility providing a service of coping with an abnormality of the application software.

With such a configuration, in a case where another abnormality in which the abnormality process cannot be performed, such as notification of the abnormality information to the outside of the vehicle occurs, for example, it is possible to notify the driver of a route to a facility capable of coping with the abnormality of the application software. Therefore, it is possible to further improve safety of driving in the vehicle while improving comfort of driving of the driver.

(13) The abnormality process associated with the combination of the adverse effect level and the second operation mode may be a process of further shifting from the notification screen to a notification screen indicating an execution result of the abnormal process.

With such a configuration, for example, the driver can confirm the execution result of the abnormality process after moving the vehicle to a safe place, it is possible to improve convenience for the driver.

(14) The abnormality processing unit may be configured, when being incapable of normally executing the selected abnormality process, not to execute, for the measure against the abnormality, a different abnormality process different from the abnormality process.

With such a configuration, it is possible to suppress the load of the abnormality process on the computer included in the vehicle-mounted device.

(15) A vehicle-mounted device according to an embodiment of the present disclosure is a vehicle-mounted device to be mounted in a vehicle, the vehicle-mounted device includes a monitoring unit configured to detect an abnormality of application software used in the vehicle, and an abnormality processing unit configured to, in response to the monitoring unit detecting the abnormality of the application software, select an abnormality process for a measure against the abnormality from among a plurality of abnormality processes in accordance with an adverse effect level of the application software on safe driving of the vehicle.

With such a configuration, in a case where abnormality occurs in the application software installed in the vehicle, it is possible to appropriately change the content of the abnormality process according to how much the application software affects the safe driving of the vehicle. Therefore, it is possible to more effectively improve the safety of driving in the vehicle in which the application software is installed.

(16) A vehicle monitoring method according to an embodiment of the present disclosure is a vehicle monitoring method for a vehicle-mounted device to be mounted in a vehicle, the vehicle monitoring method includes detecting an abnormality of application software used in the vehicle, and in response to the abnormality of the application software being detected, selecting an abnormality process for a measure against the abnormality from among a plurality of abnormality processes in accordance with an adverse effect level of the application software on safe driving of the vehicle.

With such a configuration, in a case where abnormality occurs in the application software installed in the vehicle, it is possible to appropriately change the content of the abnormality process according to how much the application software affects the safe driving of the vehicle. Therefore, it is possible to more effectively improve the safety of driving in the vehicle in which the application software is installed.

An aspect of the present disclosure can be realized as a semiconductor integrated circuit that realizes a part or all of a vehicle-mounted device, or can be realized as a system including a vehicle-mounted device.

Hereinafter, embodiments of the present disclosure will be described with reference to the drawings. In the drawings, the same or corresponding portions are denoted by the same reference numerals, and description thereof will not be repeated. Further, at least a part of the embodiments described below may be arbitrarily combined.

FIG. 1 is a diagram showing a configuration of a vehicle management system according to an embodiment of the present disclosure. FIG. 1 shows an example of monitoring contents for application software in an in-vehicle network.

Referring to FIG. 1, a vehicle management system 401 includes a vehicle-mounted system 201, servers 301, 302, and a display device 303. Vehicle-mounted system 201 is mounted on a vehicle 161, and includes one or more vehicle-mounted devices. FIG. 1 illustrates a case where vehicle-mounted system 201 includes two vehicle-mounted devices 101, 102 as an example. A vehicle-mounted device 101 includes a management unit 51 and an update unit 52.

Examples of the vehicle-mounted device include a TCU (Telematics Control Unit), an automatic driving ECU (Electronic Control Unit), an engine ECU, a sensor, a navigation device, a human-machine interface, and a camera. In the example shown in FIG. 1, vehicle-mounted device 101 communicates with a device outside vehicle 161, such as servers 301, 302, via a wireless base station (not shown) or the like.

Each vehicle-mounted device in vehicle-mounted system 201 constitutes an in-vehicle network 151. The connection relationship between the vehicle-mounted devices in in-vehicle network 151 is fixed, for example.

A server 301 is, for example, an OTA (Over the Air) server, and updates various types of software used in in-vehicle network 151.

Server 302 is, for example, a SOC (Security Operation Center) server, monitors in-vehicle network 151, and performs, for example, detection and analysis of a cyber-attack. Server 302 is, for example, a cloud server.

Update unit 52 in vehicle-mounted device 101 downloads application software AP from server 301 when it is necessary to update application software AP in in-vehicle network 151 in a state of waiting for activation. Next, update unit 52 transfers application software AP to the target vehicle-mounted device, here, vehicle-mounted device 102.

Vehicle-mounted device 102 installs application software AP transferred from vehicle-mounted device 101 to upgrade the software to a safe version in terms of security, for example. Then, vehicle-mounted device 102 transmits a completion notification indicating the completion of the update to vehicle-mounted device 101.

Update unit 52 in vehicle-mounted device 101 receives the completion notification from vehicle-mounted device 102, and transitions to the activation waiting state.

Management unit 51 in vehicle-mounted device 101 performs abnormality detection and the like of various application software in vehicle-mounted device 101. For example, management unit 51 monitors application software that controls the state transition of update unit 52, creates log information indicating the monitoring result, and uploads the log information to server 302.

Server 302 analyzes the log information received from management unit 51, and visualizes the monitoring status by performing a process of displaying the analysis result on the screen of display device 303, for example. Specifically, for example, when it is determined that the state transition of update unit 52 is normal, server 302 displays a graph indicating the monitoring state and a message indicating that the state transition is normal on the screen of display device 303.

Figure 2:
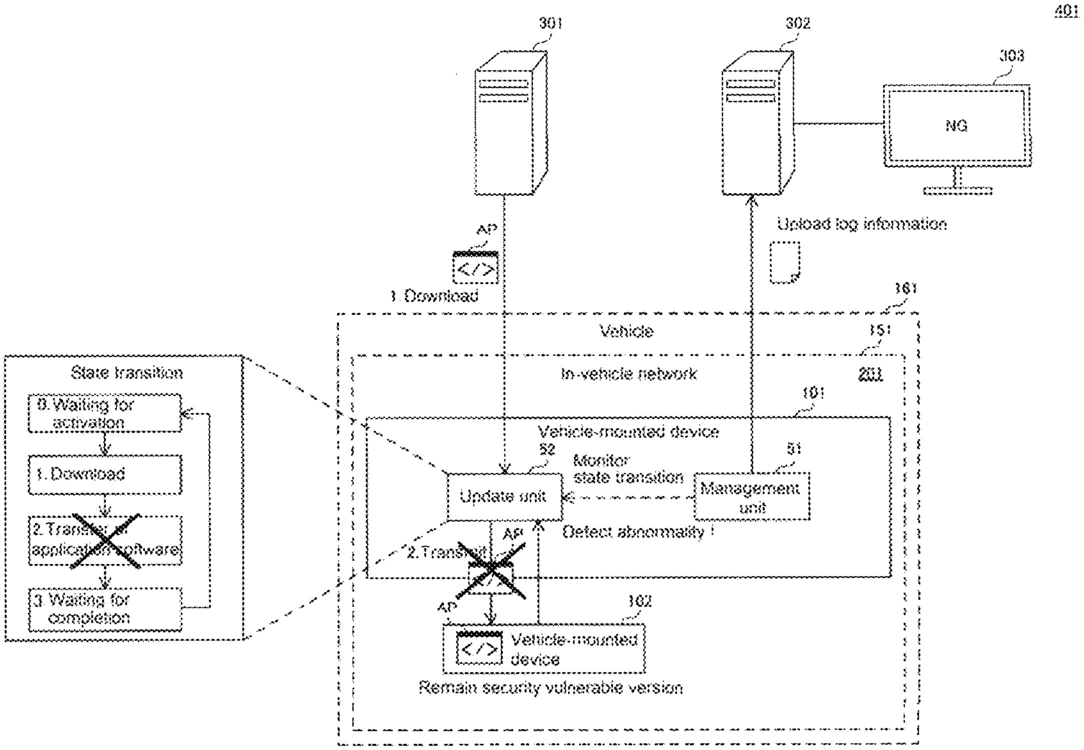
FIG. 2 is a diagram showing an example of a situation in which abnormality occurs in a vehicle-mounted system according to the embodiment of the present disclosure.

FIG. 2 is a diagram showing an example of a situation in which abnormality occurs in a vehicle-mounted system according to an embodiment of the present disclosure.

Referring to FIG. 2, in a state where update unit 52 in vehicle-mounted device 101 has downloaded application software AP from server 301, if the transfer of application software AP to vehicle-mounted device 102 fails due to some abnormality, a version vulnerable in terms of security is maintained as software in vehicle-mounted device 102.

Management unit 51 in vehicle-mounted device 101 detects the abnormality of the state transition of update unit 52, creates log information indicating the detection result, and uploads the log information to server 302.

Server 302 analyzes the log information received from management unit 51, determines that the state transition of update unit 52 is abnormal, and displays a graph indicating the monitoring status and the fact that the state transition is abnormal on the screen of display device 303.

Figure 3:
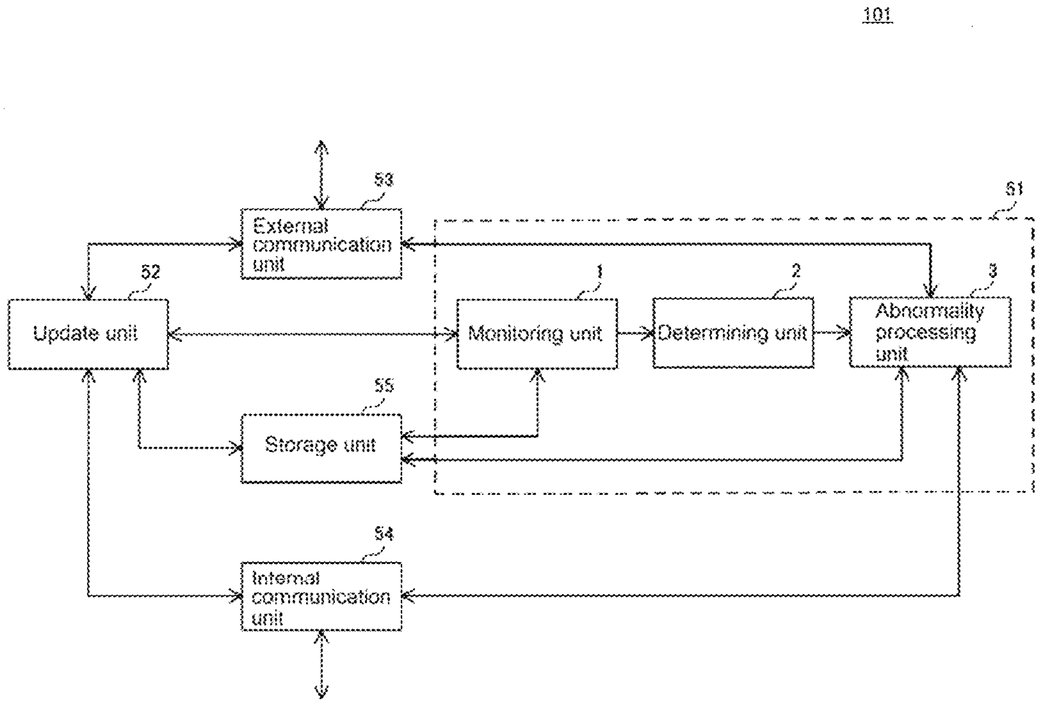
FIG. 3 is a diagram showing a configuration of a vehicle-mounted device according to the embodiment of the present disclosure in detail.

FIG. 3 is a diagram showing a configuration of a vehicle-mounted device according to an embodiment of the present disclosure in detail.

Referring to FIG. 3, vehicle-mounted device 101 includes management unit 51, update unit 52, an external communication unit 53, an internal communication unit 54, and a storage unit 55. Management unit 51 includes a monitoring unit 1, a determining unit 2, and an abnormality processing unit 3. Management unit 51 and update unit 52 are configured by a processor such as a CPU (Central Processing Unit) or a DSP (Digital Signal Processing), for example. External communication unit 53 and internal communication unit 54 are realized by a communication circuit such as a communication IC (Integrated Circuit). Storage unit 55 is, for example, a nonvolatile memory.

External communication unit 53 communicates with server 302 or the like on the outside of vehicle 161. Internal communication unit 54 communicates with other vehicle-mounted devices in in-vehicle network 151.

Update unit 52 updates the application software as described above via external communication unit 53 and internal communication unit 54.

Monitoring unit 1 detects the abnormality of application software used in vehicle 161. More specifically, monitoring unit 1 detects the abnormality of various types of application software in vehicle-mounted device 101, for example, and notifies the detection result to abnormality processing unit 3.

Determining unit 2 discriminates the type of the application software whose abnormality is detected by monitoring unit 1.

Abnormality processing unit 3 determines an adverse effect level for safe driving of the vehicle provided by the application software based on the determination result of determining unit 2. Abnormality processing unit 3 selects an abnormality process for measuring the abnormality from among the plurality of abnormality processes according to the adverse effect level determined by determining unit 2.

Further, abnormality processing unit 3 performs notification to server 302 described later via external communication unit 53, and performs notification to the driver described later via internal communication unit 54.

Figure 4:
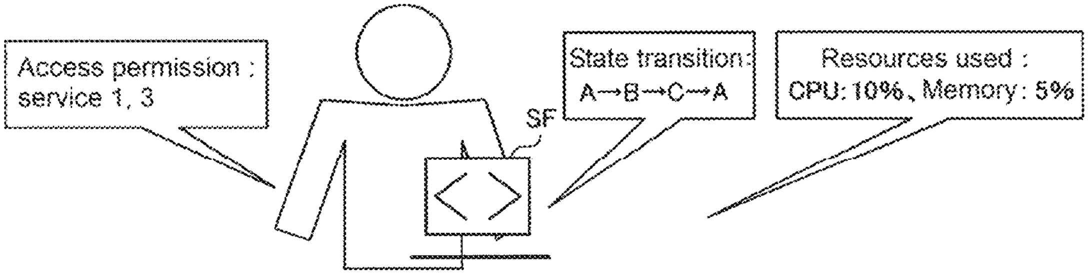
FIG. 4 is a diagram showing an example of design information used for abnormality detection by a management unit according to the embodiment of the present disclosure.

FIG. 4 is a diagram showing an example of design information used for abnormality detection by management unit 51 according to an embodiment of the present disclosure.

Referring to FIG. 4, a creator of application software to be managed in vehicle management system 401 defines access permission, state transition, resources to be used, and the like of the application software, and registers them in design information. That is, the design information indicates the definition content regarding the behavior of the application software installed in vehicle 161.

In the example shown in FIG. 4, the application software is allowed access to services 1 and 3. Further, the state of the application transits from the A state to the B state, from the B state to the C state, and from the C state to the A state in this order. Regarding resources used by the application software, the occupancy rate of the CPU is 10% or less and the occupancy rate of the memory is 5% or less.

FIG. 5 is a diagram showing a method for obtaining design information by management unit 51 according to an embodiment of the present disclosure.

Referring to FIG. 5, the design information is deployed in vehicle-mounted system 201 before the application software to be managed is installed in vehicle 161.

The deployment destination may be management unit 51, or may be a platform or middleware that executes the application software.

When the deployment destination is management unit 51, management unit 51 directly stores the design information in storage unit 55. On the other hand, when the deployment destination is a platform or the like, management unit 51 acquires design information from the platform or the like and stores the acquired design information in storage unit 55.

Monitoring unit 1 in management unit 51 determines the abnormality of the application software based on the design information. More specifically, monitoring unit 1 can determine the abnormality of the application software by referring to the design information in storage unit 55. Specifically, monitoring unit 1 can determine an abnormality related to an access destination, a state transition, a use state of a resource, and the like of the application software. Monitoring unit 1 is not limited to such an example, and may be configured to determine the abnormality of the version of the application software, for example.

FIG. 6 is a diagram showing an example of an abnormality process by management unit 51 according to an embodiment of the present disclosure.

Referring to FIG. 6, abnormality processing unit 3 in management unit 51 selects an abnormality process for a measure against the abnormality from among a plurality of abnormality processes in accordance with an adverse effect level on safe driving of vehicle 161 provided by the application software in which the abnormality is detected.

For example, abnormality processing unit 3 executes a measure corresponding to the adverse effect level of the application software in which the abnormality is detected. In the above example, abnormality processing unit 3 determines the adverse effect level based on the determination result of determining unit 2. However, when the adverse effect level of the application software is registered in advance in the above-described design information, abnormality processing unit 3 specifies the adverse effect level based on the design information associated with the application software.

In addition, when abnormality processing unit 3 cannot perform a specific abnormality process, abnormality processing unit 3 performs another abnormality process. For example, another abnormality process may be a process for vehicle 161 or a process other than vehicle 161.

More specifically, abnormality processing unit 3 has operation modes including a normal mode which is a first operation mode and an emergency mode which is a second operation mode. The abnormality process is associated with each combination of the adverse effect level and the operation mode. When operating in the normal mode, abnormality processing unit 3 selects and executes an abnormality process associated with a combination of the adverse effect level and the normal mode. When the abnormality state of the application software is not improved even by performing the abnormality process, abnormality processing unit 3 shifts from the normal mode to the emergency mode, and selects and executes the abnormality process associated with a combination of the adverse effect level and the emergency mode.

Storage unit 55 stores an abnormality process table tb2 indicating a correspondence relationship among an adverse effect level of the application software, a measure at the time of an abnormality occurrence, a transition condition from the normal mode to the emergency mode, and a measure in the emergency mode.

In abnormality process table tb2, it is defined that when an abnormality occurs in the application software of adverse effect level 1, abnormality processing unit 3 notifies server 302 of the abnormality. When abnormality processing unit 3 cannot notify the abnormality for some reason, abnormality processing unit 3 shifts from the normal mode to the emergency mode, and notifies the driver of vehicle 161 of the abnormality occurrence.

In addition, when abnormality occurs in the application software of adverse effect level 2, abnormality processing unit 3 notifies server 302 of the abnormality and deletes or restores, that is, updates the application software. When abnormality processing unit 3 cannot notify the abnormality or cannot delete or restore the application software for some reason, abnormality processing unit 3 shifts from the normal mode to the emergency mode. Next, abnormality processing unit 3 notifies the driver of vehicle 161 of the abnormality occurrence, instructs the driver to move vehicle 161 to a safe place, and specifies and removes a cause that is an obstacle to recovery by using a virus check or the like.

As an example of determining the type of the application software, determining unit 2 determines whether the application software in which the abnormality has been detected is application software that performs output to the driver of vehicle 161. Then, abnormality processing unit 3 determines the adverse effect level based on the determination result by determining unit 2.

Specifically, for example, determining unit 2 determines whether the application software in which the abnormality is detected is audio software or application software for car navigation. Then, abnormality processing unit 3 determines the adverse effect level based on the determination result by determining unit 2.

As described above, the criterion of the adverse effect level classification of the application software is, for example, whether the abnormality directly affects the safety of the driver when the abnormality occurs in the application software. That is, in vehicle-mounted system 201, as an example, adverse effect level classification is performed in accordance with whether the application software is application software that affects the five senses of a human being, and an abnormality process is set in accordance with the adverse effect level.

More specifically, as application software that affects the safety of the driver at the time of an abnormal occurrence, the application software that affects the five senses of a human being is set to adverse effect level 2.

For example, there is a possibility that the driver is surprised by a sudden increase in volume due to the abnormality of music application software, and as a result, the driver erroneously operates the steering wheel to cause an accident.

In addition, there is a possibility that an abnormality of screen display application software such as a car navigation system may cause a display on the screen so as to confuse the driver, or excessive light may be emitted, so that the driver may be distracted, resulting in an accident.

In addition, there is a possibility that an accident may occur as a result of vibration or movement of the seat being performed by application software that controls the seat and the driver being distracted.

As another example, determining unit 2 determines whether the application software in which the abnormality is detected is software capable of writing data to a storage unit used by a vehicle-mounted device in vehicle 161. Then, abnormality processing unit 3 determines the adverse effect level based on the determination result by determining unit 2.

Specifically, for example, application software capable of changing actuator control in vehicle 161, measurement results of vehicle-mounted sensors, sound volume in music application software, and display content of screen display application software such as car navigation is set to adverse effect level 2.

As another example, determining unit 2 determines whether the application software in which the abnormality is detected is the diagnosing software. Then, abnormality processing unit 3 determines the adverse effect level based on the determination result by determining unit 2.

Specifically, for example, as application software that does not affect the five senses of the human being, there are driving diagnosis application software that monitors a driving situation of the driver and notifies a cloud server or the like of a result, state diagnosis application software of a device in vehicle 161, and the like, and such application software is set to adverse effect level 1.

Management unit 51 may be configured to divide the application software into three or more adverse effect levels.

Flow of Operation

Each device in the vehicle management system according to the embodiment of the present disclosure includes a computer including a memory, and an arithmetic process unit such as a CPU in the computer reads out a program including a part or all of each step of the following flowcharts and sequences from the memory and executes the program. The programs of the plurality of devices can each be installed from the outside. The programs of the plurality of devices are each distributed in a state of being stored in recording media.

[Installation of Application Software]

Figure 7:
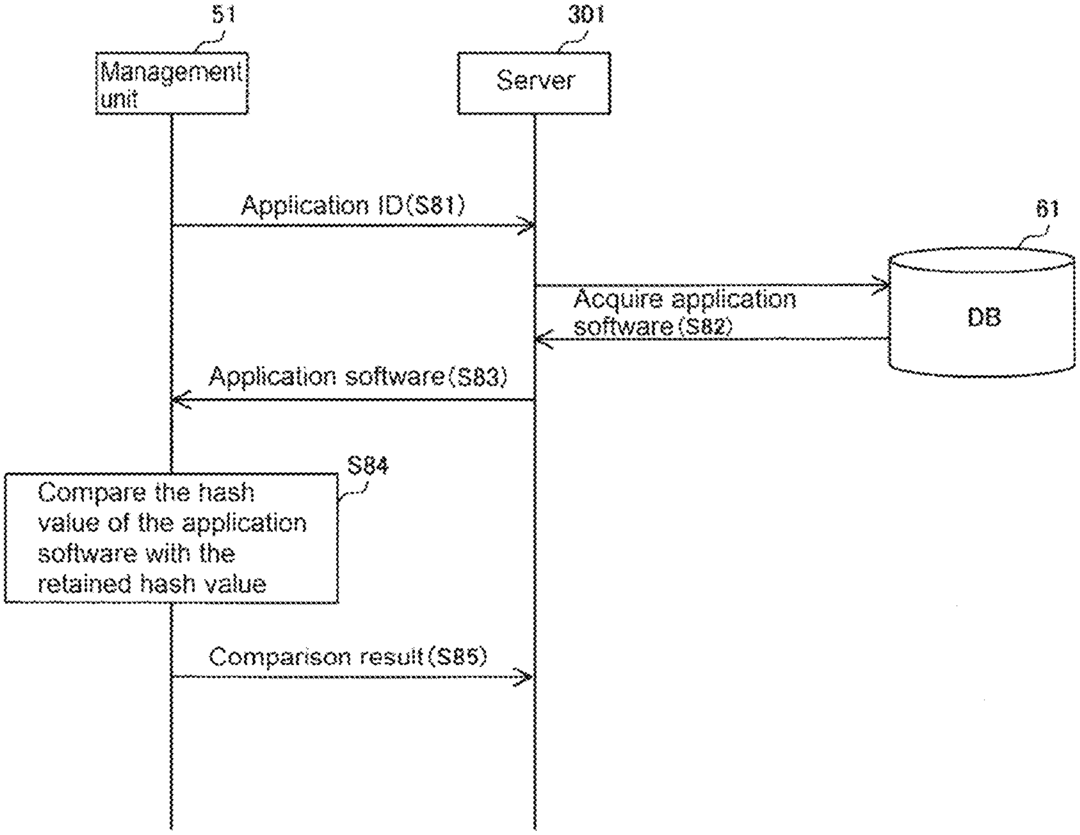
FIG. 7 is a diagram showing an example of a sequence of installing application software by a vehicle management system according to the embodiment of the present disclosure.

FIG. 7 is a diagram showing an example of a sequence of installing application software by a vehicle management system according to an embodiment of the present disclosure.

Referring to FIG. 7, first, management unit 51 in vehicle-mounted device 101 notifies server 301 of the application ID (Step S81).

Next, server 301 acquires application software corresponding to the application ID notified from management unit 51 from a database 61 (Step S82), and transmits the application software to management unit 51 (Step S83).

Figure 8:
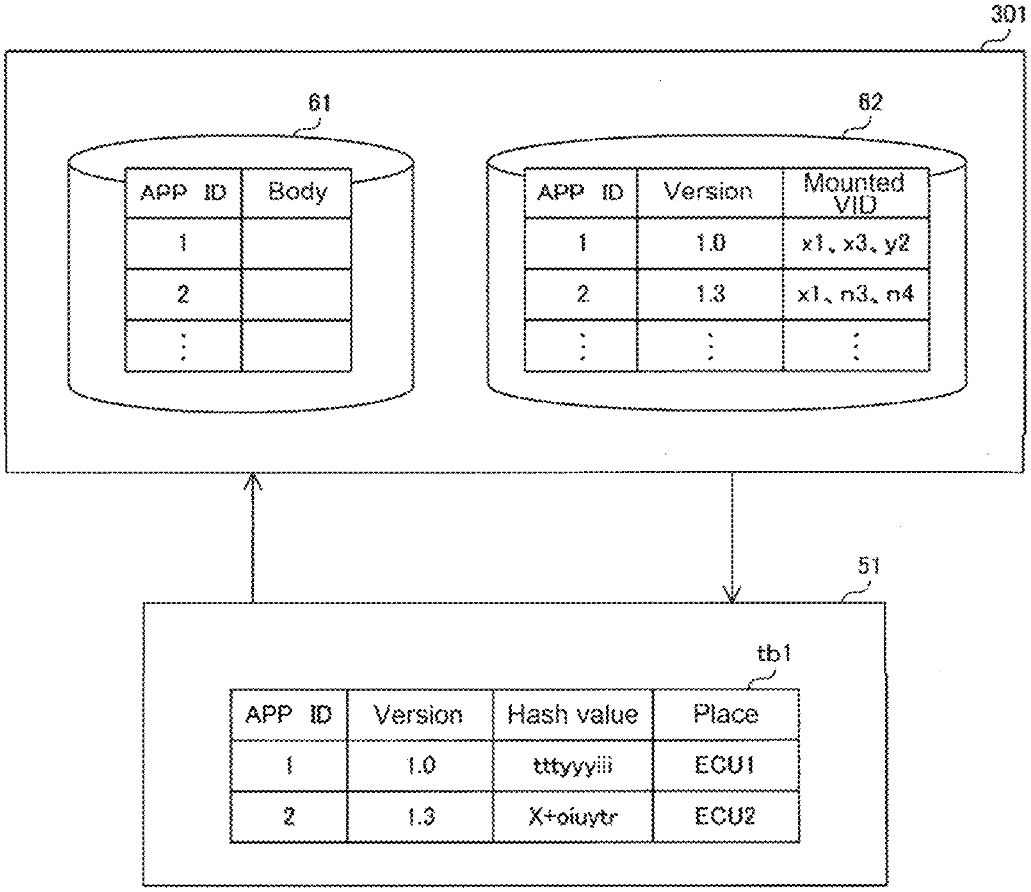
FIG. 8 is a diagram showing an example of various types of information used for installing application software in the vehicle management system according to the embodiment of the present disclosure.

FIG. 8 is a diagram showing an example of various types of information used for installing application software in the vehicle management system according to the embodiment of the present disclosure.

Referring to FIG. 8, server 301 maintains databases 61 and 62, for example, in a storage device (not shown) provided inside or outside of server 301.

In database 61, main bodies of various kinds of application software are registered in association with application IDs (APP ID).

In database 62, a table indicating a correspondence relationship among an application ID, a version of application software, and meta information such as a mounted VID (Version Identifier) is registered.

Vehicle-mounted device 101 holds, in storage unit 55, a table tb1 indicating a correspondence relationship among an application ID, a version of application software, a hash value, and an installation location of the application software.

Referring again to FIG. 7, next, management unit 51 calculates the hash value of the application software received from server 301, acquires the hash value corresponding to the application software by referring to table tb1, and compares the two hash values (Step S84).

Next, management unit 51 notifies server 301 of the comparison result. That is, when the hash values do not match, there is a possibility that the wrong application software has been downloaded from the server, and there is a possibility that management unit 51 has downloaded the application software from the wrong server (Step S85).

Figure 9:
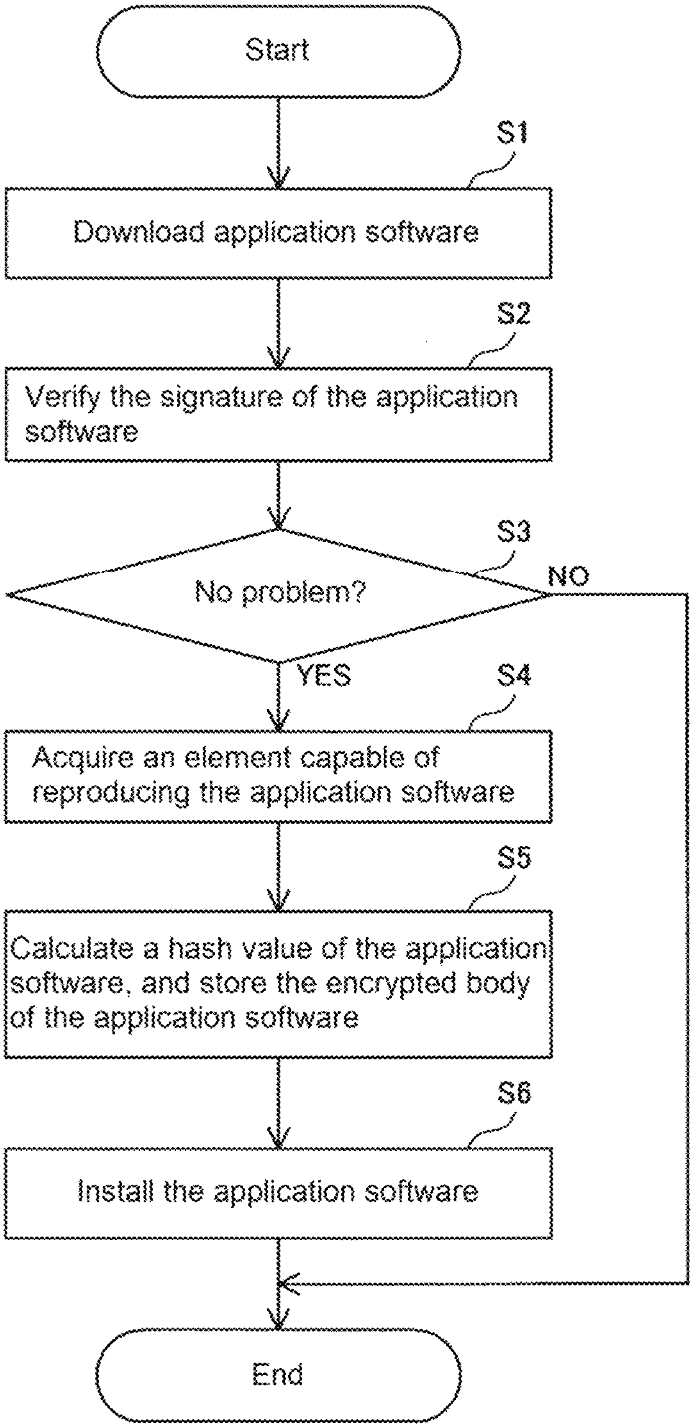
FIG. 9 is a flowchart defining an operation procedure when the vehicle-mounted system according to the embodiment of the present disclosure installs application software.

FIG. 9 is a flowchart defining an operation procedure when vehicle-mounted system 401 installs application software according to an embodiment of the present disclosure.

Referring to FIG. 9, first, update unit 52 downloads application software from server 301 (Step S1).

Next, management unit 51 verifies the signature of the application software (Step S2), and determines whether there is a problem in the signature of the application software (Step S3). When there is a problem in the signature (NO in Step S3), management unit 51 ends the process without installing the application software.

On the other hand, when there is no problem in the signature of the application software (YES in Step S3), management unit 51 acquires an element capable of reproducing the application software, such as a copy of the application software, in order to write back the application software at the time of abnormality in the future (Step S4).

Next, management unit 51 calculates a hash value of the application software, and stores the encrypted body of the application software and the calculated hash value in storage unit 55. Management unit 51 may be configured to store the hash value in storage unit 55 and store the main body in the cloud server (Step S5).

Next, application software is installed in the target vehicle-mounted device by update unit 52 (Step S6).

[Abnormality Process During Operation of Application Software]

In vehicle-mounted system 201, first, management unit 51 detects the abnormality of application software used in vehicle 161.

Figure 10:
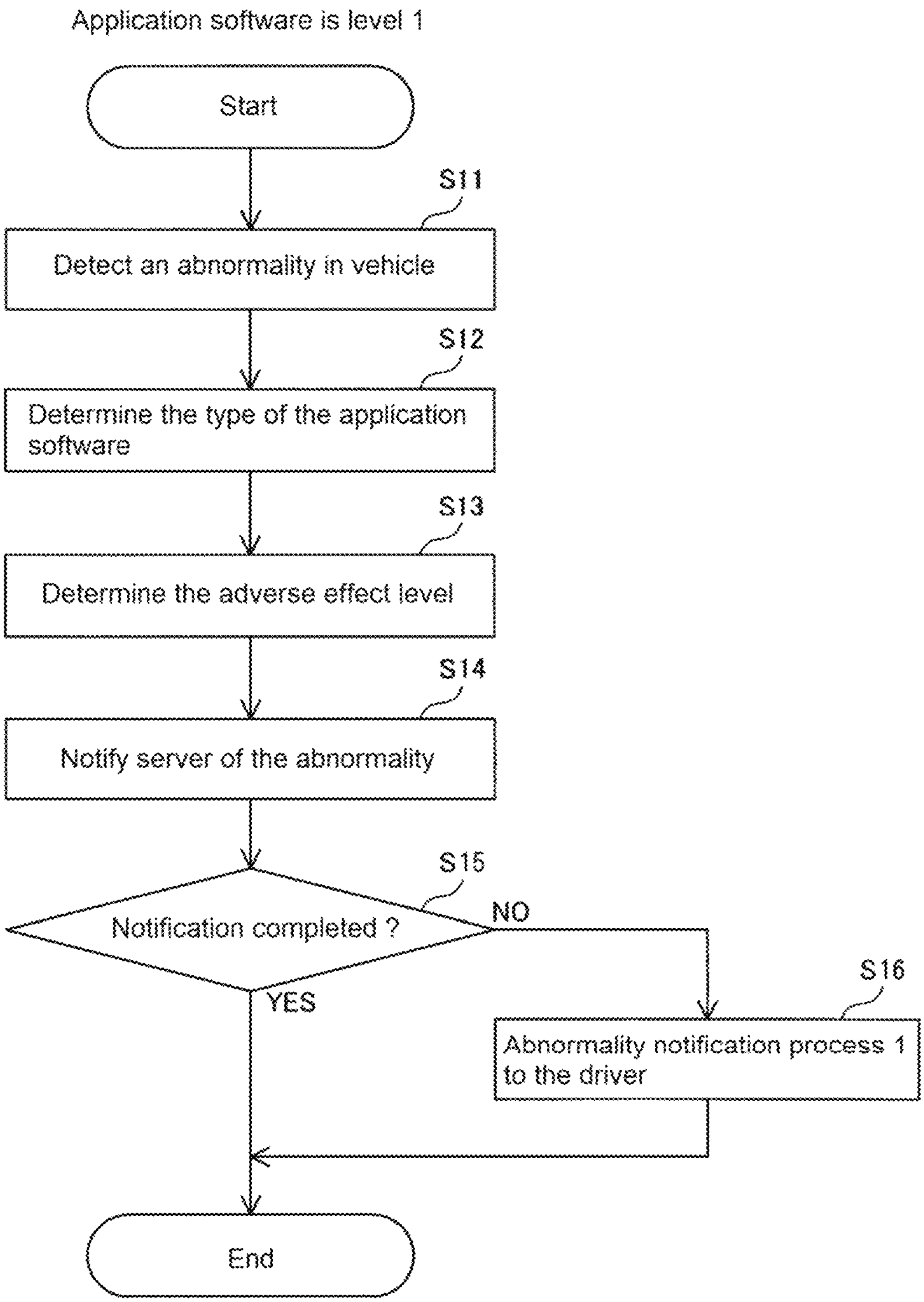
FIG. 10 is a flowchart defining an operation procedure when the management unit according to the embodiment of the present disclosure performs an abnormality process.
Figure 11:
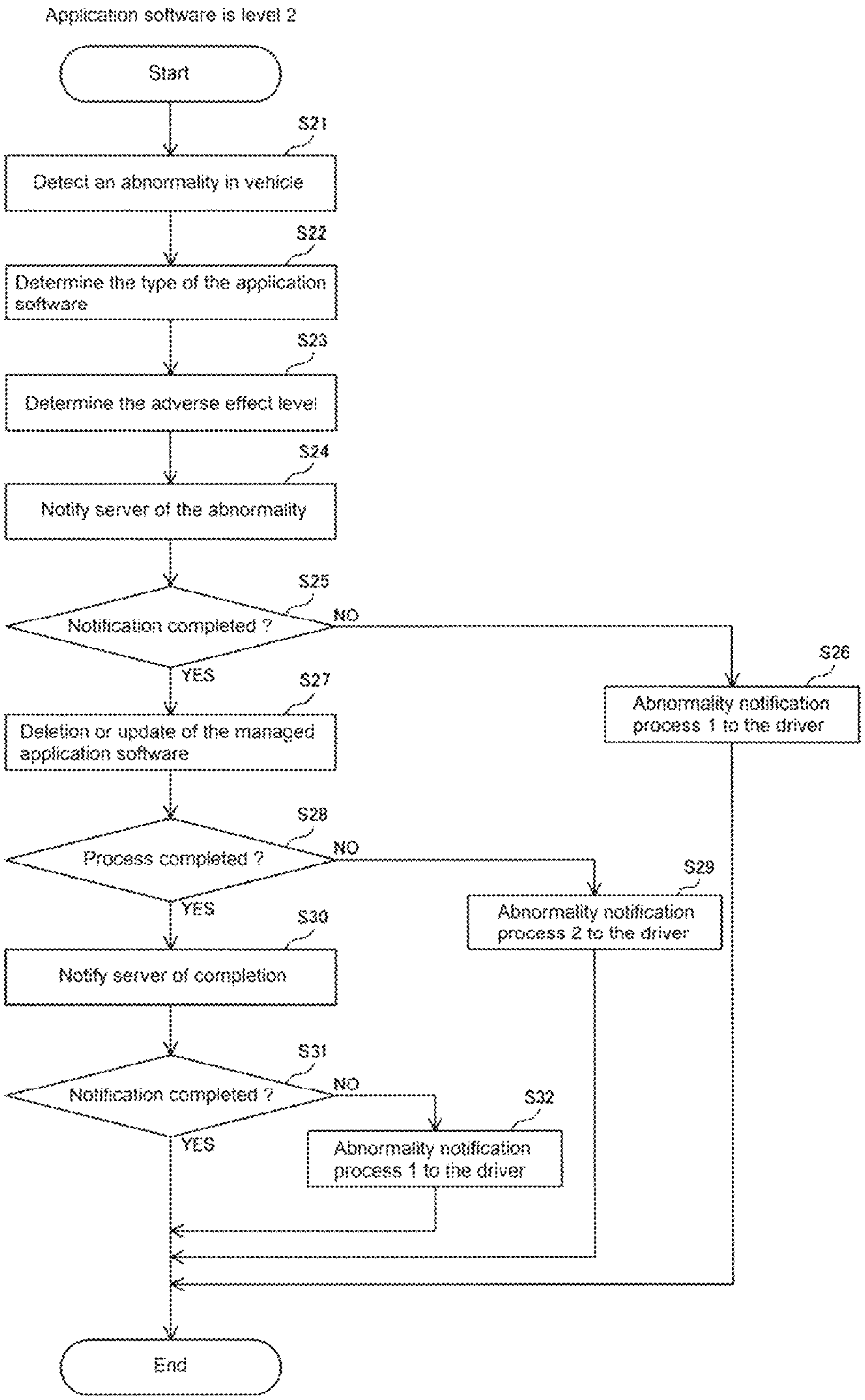
FIG. 11 is a flowchart defining an operation procedure when the management unit according to the embodiment of the present disclosure performs the abnormality process.

Next, when the abnormality of the application software is detected, management unit 51 selects an abnormality process for a measure against the abnormality from among a plurality of abnormality processes in accordance with an adverse effect level with respect to safe driving of vehicle 161 provided by the application software, as shown in FIGS. 10 and 11 below.

FIG. 10 is a flowchart defining an operation procedure when management unit 51 according to the embodiment of the present disclosure performs the abnormality process. FIG. 10 shows the abnormality process for the application software of adverse effect level 1.

Referring to FIG. 10, first, monitoring unit 1 detects the abnormality of the application software of an adverse effect level 1 in vehicle 161 (Step S11). Determining unit 2 determines the type of the application software in which the abnormality is detected (Step S12). Abnormality processing unit 3 determines the adverse effect level of the application software to be level 1 based on the determination result determined by determining unit 2 (Step S13).

Next, abnormality processing unit 3 notifies server 302 of the abnormality (Step S14). Management unit 51 determines whether the notification of the abnormality is completed (Step S15). When the notification of the abnormality is completed (YES in Step S15), the process is ended.

On the other hand, when the abnormality notification cannot be performed (NO in Step S15), abnormality processing unit 3 performs an abnormality notification process 1 to the driver of vehicle 161 (Step S16).

FIG. 11 is a flowchart defining an operation procedure when management unit 51 according to the embodiment of the present disclosure performs the abnormality process. FIG. 11 shows the abnormality process for the application software of adverse effect level 2.

Referring to FIG. 11, first, monitoring unit 1 detects the abnormality of the application software of adverse effect level 2 in vehicle 161 (Step S21). Determining unit 2 determines the type of the application software in which the abnormality is detected (Step S22). Abnormality processing unit 3 determines the adverse effect level of the application software to be level 2 based on the determination result determined by determining unit 2 (Step S23).

Next, abnormality processing unit 3 notifies server 302 of the abnormality (Step S24).

Next, abnormality processing unit 3 determines whether the notification of the abnormality is completed (Step S25). When the notification of the abnormality cannot be performed (NO in Step S25), abnormality processing unit 3 performs the abnormality notification process 1 to the driver of vehicle 161 (Step S26).

On the other hand, when the notification of the abnormality is completed (YES in Step S25), abnormality processing unit 3 performs the deletion or update process of the application software (Step S27).

Next, abnormality processing unit 3 determines whether the deletion or update process of the application software is completed (Step S28). When the deletion or update process of the application software cannot be performed (NO in Step S28), an abnormality notification process 2 to the driver of vehicle 161 is performed (Step S29).

On the other hand, when the deletion or update process of the application software is completed (YES in Step S28), abnormality processing unit 3 notifies server 302 of completion of handling (Step S30).

Next, abnormality processing unit 3 determines whether the notification of the handling completion is completed (Step S31). When the notification of the handling completion cannot be performed (NO in Step S31), abnormality processing unit 3 performs abnormality notification process 1 to the driver of vehicle 161 (Step S32).

On the other hand, when the notification of the handling completion is completed (YES in Step S31), abnormality processing unit 3 ends the process.

Figure 12:
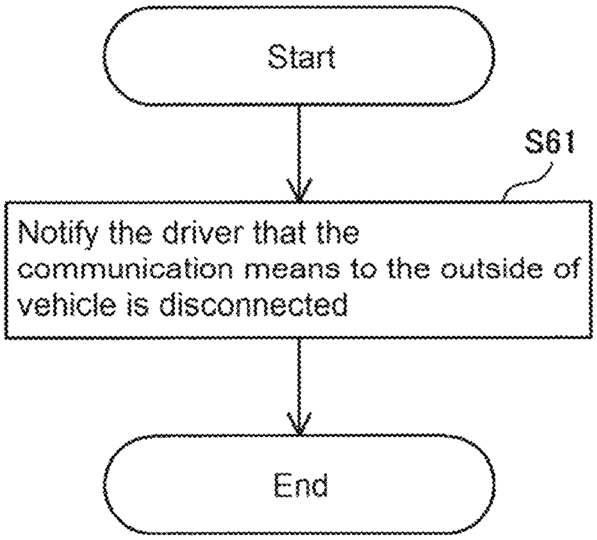
FIG. 12 is a flowchart defining an operation procedure when an abnormality notification process 1 is performed by the management unit according to the embodiment of the present disclosure.

FIG. 12 is a flowchart defining an operation procedure when the abnormality notification process 1 is performed by management unit 51 according to the embodiment of the present disclosure.

Referring to FIG. 12, abnormality processing unit 3 notifies the driver that the communication means to the outside of vehicle 161 is disconnected (Step S61).

Figure 13:
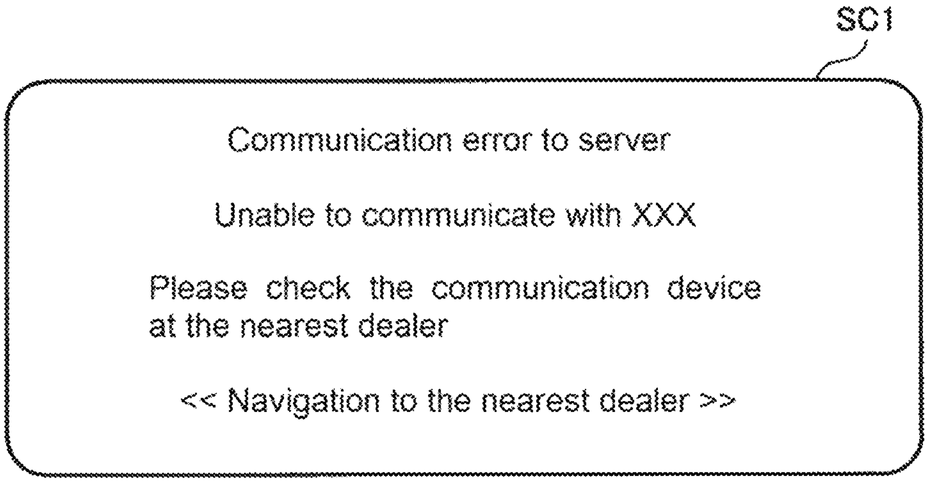
FIG. 13 is a diagram showing an example of a display screen in the abnormality notification process 1 by the management unit according to the embodiment of the present disclosure.

FIG. 13 is a diagram showing an example of a display screen in the abnormality notification process 1 by management unit 51 according to the embodiment of the present disclosure.

Another abnormality process performed by abnormality processing unit 3 when the abnormality process cannot be performed is, for example, a process of outputting a notification screen to the driver of vehicle 161. Specifically, referring to FIG. 13, abnormality processing unit 3 performs the abnormality notification process 1 of outputting a notification screen to the driver of vehicle 161.

For example, the notification screen is a screen including a route guide to a facility that provides a service for dealing with the abnormality of the application software. Specifically, for example, abnormality processing unit 3 performs a process of displaying a communication abnormality, prompting measures such as confirmation of a communication device at an automobile dealer, and a notification screen SC1 including navigation to the automobile dealer on the display device of vehicle 161.

Figure 14:
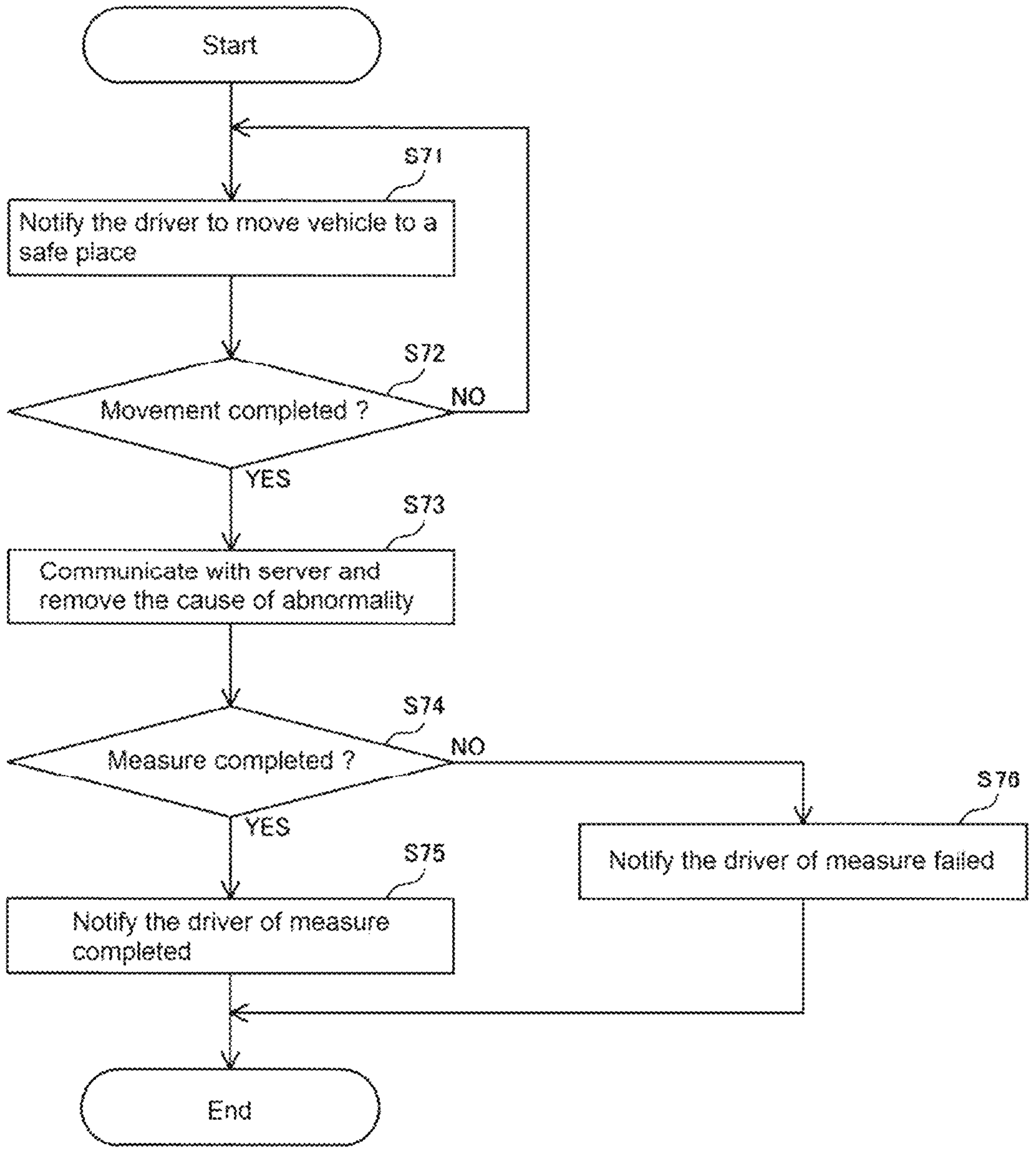
FIG. 14 is a flowchart defining an operation procedure when an abnormality notification process 2 is performed by the management unit according to the embodiment of the present disclosure.
Figure 15:
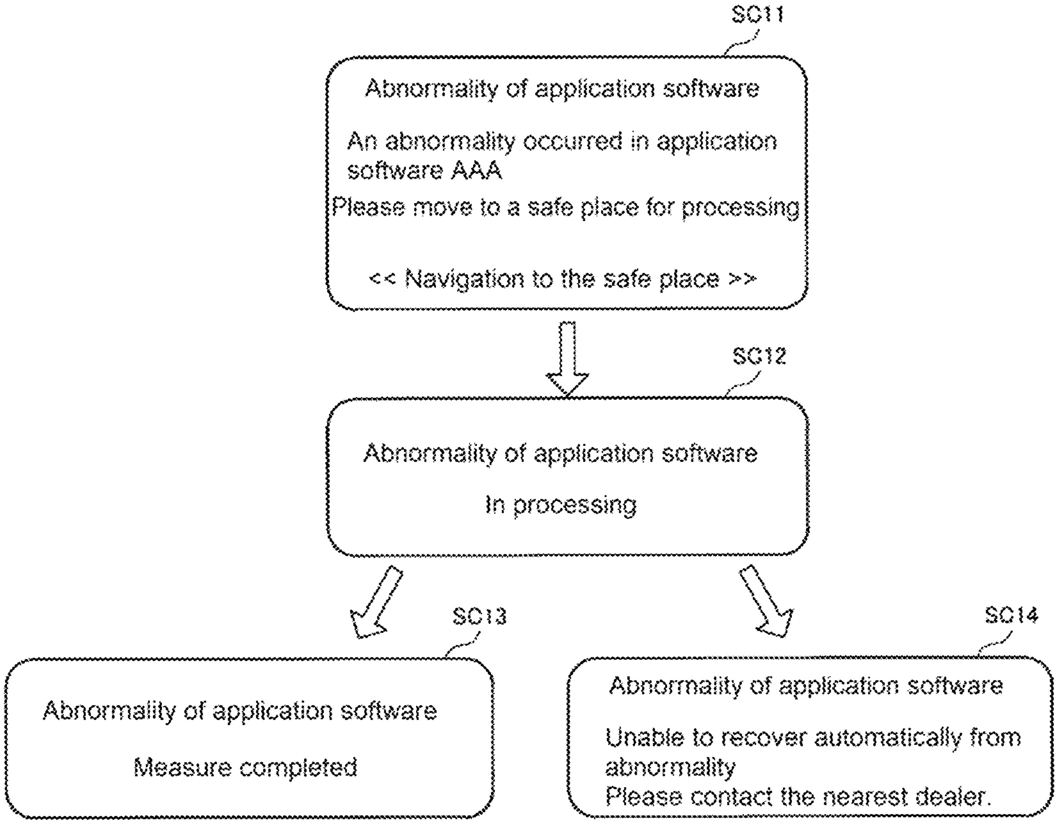
FIG. 15 is a diagram showing an example of the display screen in the abnormality notification process 2 by the management unit according to an embodiment of the present disclosure.

FIG. 14 is a flowchart defining an operation procedure when the abnormality notification process 2 is performed by management unit 51 according to the embodiment of the present disclosure. FIG. 15 is a diagram showing an example of a display screen in the abnormality notification process 2 by management unit 51 according to an embodiment of the present disclosure.

FIG. 14 shows that abnormality processing unit 3 executes a process of outputting a notification screen for prompting the driver to perform movement of vehicle 161, and executes a process of transitioning the notification screen to a notification screen of an execution result of the abnormality process.

Specifically, referring to FIGS. 14 and 15, first, abnormality processing unit 3 notifies the driver to move vehicle 161 to a safe place.

More specifically, abnormality processing unit 3 outputs a notification screen for prompting the driver of vehicle 161 to perform movement of vehicle 161. Specifically, for example, abnormality processing unit 3 performs a process of displaying, on the display device of vehicle 161, a notification screen SC11 indicating that the abnormality of the application software has occurred, prompting the driver to move to a safe place, and including navigation to the safe place (Step S71).

Next, abnormality processing unit 3 determines whether the movement of vehicle 161 to the safe place is completed (Step S72). When the movement of vehicle 161 to the safe place is completed (YES in Step S72), abnormality processing unit 3 communicates with server 302 via external communication unit 53 and downloads and executes anti-virus software or the like. Therefore, abnormality processing unit 3 removes the cause of abnormality (Step S73). On the other hand, when the movement of vehicle 161 to the safe place has not been completed (NO in Step S72), abnormality processing unit 3 continues to display notification screen SC11.

Here, abnormality processing unit 3 transitions the notification screen to the driver of vehicle 161 to the notification screen of the execution result of the abnormality process. Specifically, for example, abnormality processing unit 3 performs a process of displaying a notification screen SC12 including fact that the abnormality of the application software is being measured on the display device of the vehicle 161.

Next, abnormality processing unit 3 determines whether the measure which is the removal of the cause of the abnormality is completed (Step S74). When the measure, which is the removal of the cause of the abnormality, is completed (YES in Step S74), abnormality processing unit 3 performs a process of displaying a notification screen SC13 including fact that the measure against the abnormality of the application software is completed on the display device of vehicle 161 (Step S75).

On the other hand, when the measure for removing the cause of abnormality cannot be performed (NO in Step S74), abnormality processing unit 3 notifies the driver of vehicle 161 of measure failure (Step S76).

More specifically, abnormality processing unit 3 performs a process of displaying, on the display device of vehicle 161, a notification screen SC14 indicating that automatic recovery from the abnormality of the application software is not possible and prompting contact with a nearby car dealer.

Figure 16:
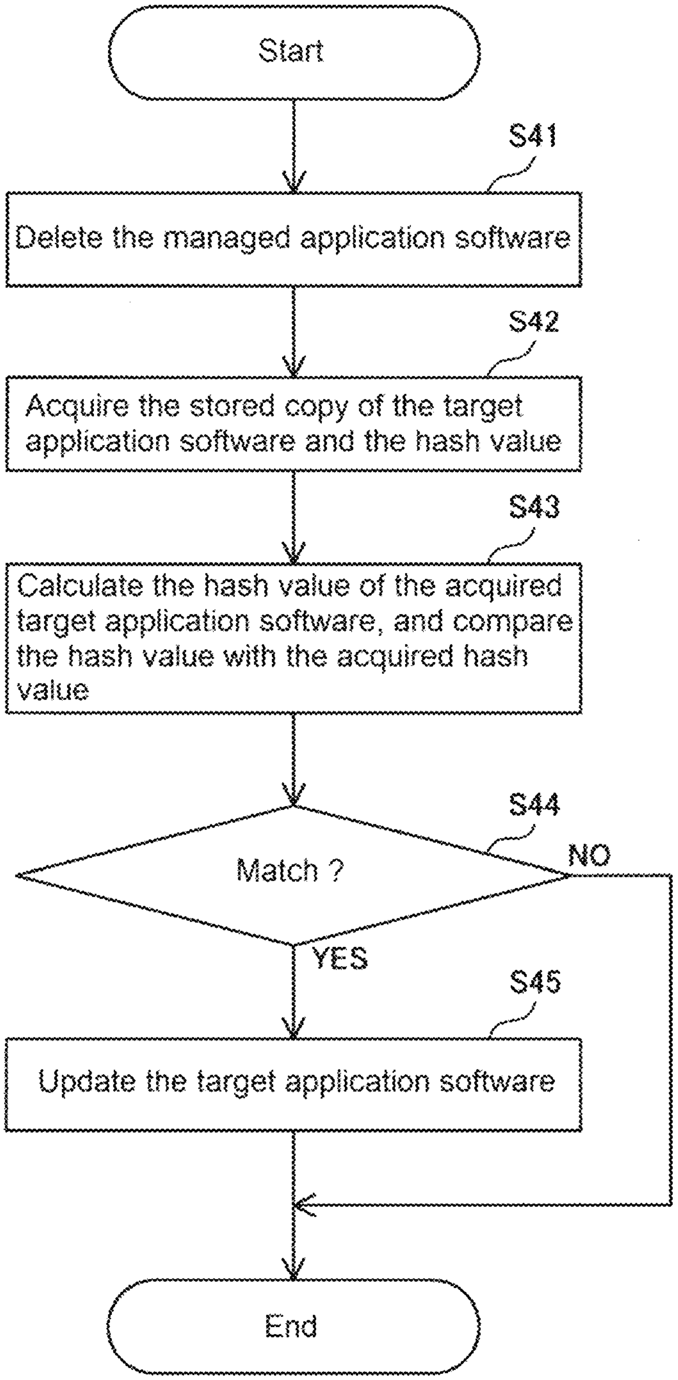
FIG. 16 is a flowchart defining an operation procedure when the management unit according to the embodiment of the present disclosure performs a deletion or update process of application software.

FIG. 16 is a flowchart defining an operation procedure when management unit 51 according to an embodiment of the present disclosure performs a deletion or update process of application software. FIG. 16 shows details of the process of Step S25 shown in FIG. 11 when the update application software is stored in vehicle 161.

Referring to FIG. 16, first, abnormality processing unit 3 deletes the target application software in which the abnormality is detected (Step S41).

Next, abnormality processing unit 3 acquires the copy of the target application software and the hash value (Step S42) stored in storage unit 55 as described above (Step S5 in FIG. 9).

Next, abnormality processing unit 3 calculates the hash value of the acquired target application software, and compares the hash value with the hash value acquired from storage unit 55 (Step S43).

Abnormality processing unit 3 determines whether the acquired hash value matches the calculated hash value (Step S44). When the acquired hash value matches the calculated hash value (YES in Step S44), abnormality processing unit 3 installs the acquired target application software, that is, updates the target application software (Step S45).

On the other hand, when the acquired hash value does not match the calculated hash value (NO in Step S44), abnormality processing unit 3 determines that the target application software stored in storage unit 55 has been tampered with, for example, and ends the process without updating the target application software.

Figure 17:
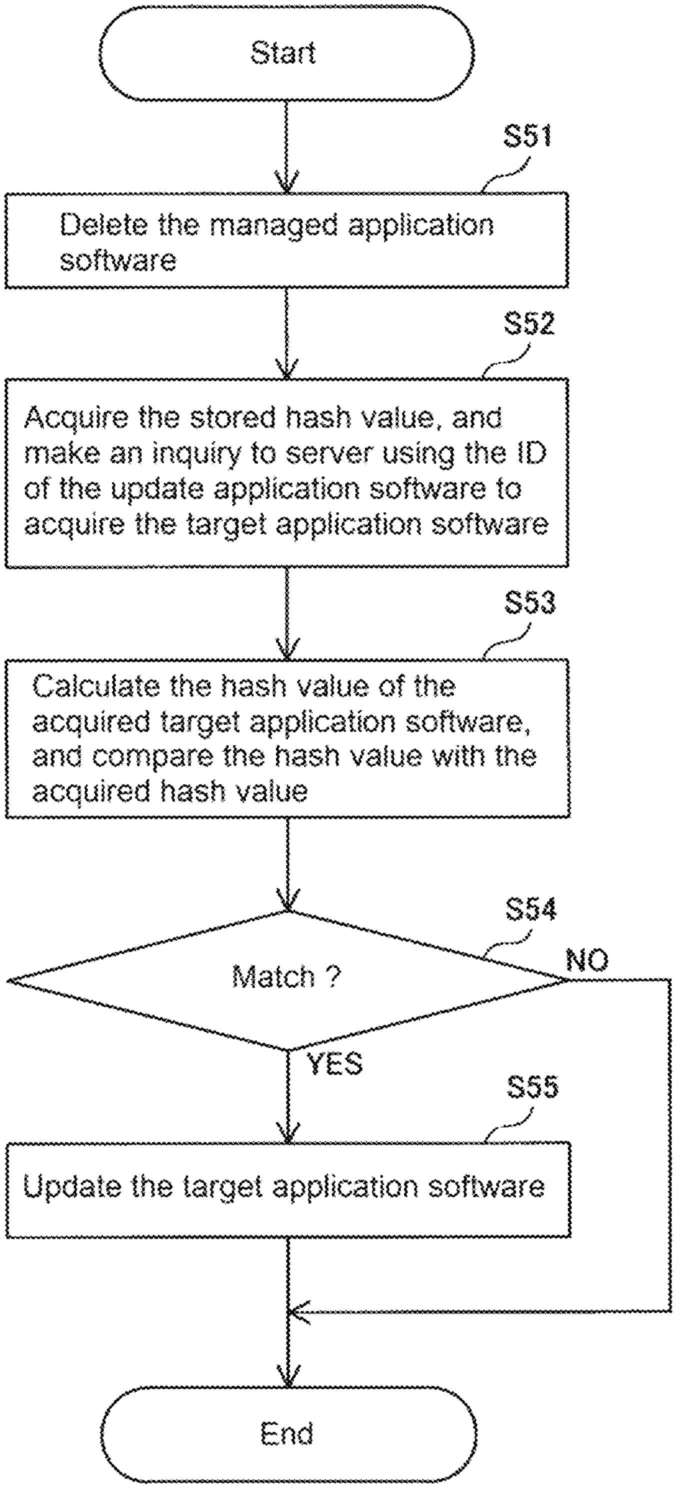
FIG. 17 is a flowchart defining an operation procedure when the management unit according to the embodiment of the present disclosure performs a deletion or update process of application software.

FIG. 17 is a flowchart defining an operation procedure when management unit 51 according to an embodiment of the present disclosure performs a deletion or update process of application software. FIG. 17 shows details of the process of Step S25 shown in FIG. 11 when the updated application software is stored at server 301.

Referring to FIG. 17, first, abnormality processing unit 3 deletes the target application software in which the abnormality is detected (Step S51).

Next, abnormality processing unit 3 acquires the hash value of the target application software stored in the storage unit 55 (Step S5 in FIG. 9), and makes an inquiry to server 301 using the ID of the update application software as shown in FIG. 7 to acquire the target application software (Step S52).

Next, abnormality processing unit 3 calculates the hash value of the acquired target application software, and compares the hash value with the hash value acquired from storage unit 55 (Step S53).

Abnormality processing unit 3 determines whether the acquired hash value matches the calculated hash value (Step S54). When the acquired hash value matches the calculated hash value (YES in Step S54), abnormality processing unit 3 installs the acquired target application software, that is, updates the target application software (Step S55).

On the other hand, when the acquired hash value does not match the calculated hash value (NO in Step S54), abnormality processing unit 3 determines that the target application software stored in storage unit 55 has been tampered with, for example, and ends the process without updating the target application software.

As described above, in the embodiment of the present disclosure, management unit 51 can prevent the transition of vehicle 161 to the unsafe state by detecting the application software deviating or about to deviate from the assumed operation due to a malfunction, tampering, or the like, for example, from the dynamic behavior of the application software. Further, management unit 51 can perform automatic recovery from abnormality.

In vehicle-mounted system 201 according to the embodiment of the present disclosure, vehicle-mounted device 101 capable of communicating with a device outside vehicle 161 includes management unit 51. However, the present disclosure is not limited thereto. Another vehicle-mounted device in the in-vehicle network may include management unit 51.

In vehicle-mounted device 101 according to the embodiment of the present disclosure, abnormality processing unit 3 is configured to perform another abnormality process when the abnormality process cannot be performed. However, the present disclosure is not limited thereto, and may be configured not to perform another abnormality process.

In order for a vehicle to provide various services such as entertainment to a driver, various types of application software will be installed in the vehicle. In an environment in which such various types of application software are installed, a technique for further improving safety of driving in a vehicle is desired.

Specifically, for example, it is assumed that services and application software are frequently added from the outside of the vehicle by OTA due to the IT introduction of the vehicle, and the function and performance of the vehicle are improved. Thus, a situation that has not existed in the vehicle so far occurs. A failure of the application software of the vehicle may lead to insecurity of the vehicle, and safety needs to be considered more than that of consumer application software.

On the other hand, in the vehicle monitoring program and vehicle-mounted device 101 according to the embodiment of the present disclosure, monitoring unit 1 detects the abnormality of the application software used in vehicle 161. When monitoring unit 1 detects the abnormality of the application software, abnormality processing unit 3 selects an abnormality process for measuring the abnormality from among a plurality of abnormality processes in accordance with an adverse effect level to safe driving of vehicle 161 provided by the application software.

In the vehicle monitoring method according to the embodiment of the present disclosure, first, monitoring unit 1 detects the abnormality of the application software used in vehicle 161. Next, when the abnormality of the application software is detected, abnormality processing unit 3 performs an abnormality process, and selects an abnormality process for a measure against the abnormality from among a plurality of abnormality processes in accordance with an adverse effect level to safe driving of vehicle 161 provided by the application software.

With such a configuration, when the abnormality occurs in the application software installed in the vehicle, the abnormality process is appropriately selected according to how much the application software affects the safe driving of the vehicle.

Therefore, in the vehicle monitoring program, the vehicle-mounted device, and the vehicle monitoring method according to the embodiments of the present disclosure, it is possible to more effectively improve driving safety in a vehicle in which application software is installed.

The above-described embodiments are to be considered in all respects as illustrative and not restrictive. The scope of the present invention is defined not by the above description but by the claims, and is intended to include meanings equivalent to the claims and all modifications within the scope.

The foregoing description includes the following additional features.

Supplementary Note 1

A vehicle-mounted device to be mounted in a vehicle, the vehicle-mounted device includes a monitoring unit configured to detect an abnormality of application software used in the vehicle, and an abnormality processing unit configured to, in response to the monitoring unit detecting the abnormality of the application software, select an abnormality process for a measure against the abnormality from among a plurality of abnormality processes in accordance with an adverse effect level of an adverse effect of the application software on safe driving of the vehicle. The monitoring unit acquires design information indicating a definition content regarding behavior of application software mounted on the vehicle, and detects abnormality of the application software based on the design information.

REFERENCE SIGNS LIST

1 monitoring unit, 2 determining unit, 3 abnormality processing unit, 51 management unit, 52 update unit, 53 external communication unit, 54 internal communication unit, 55 storage unit, 101, 102 vehicle-mounted device, 161 vehicle, 201 vehicle-mounted system, 301, 302 server, 303 display device, 401 vehicle management system

The invention claimed is:

1. A non-transitory computer-readable recording medium storing a vehicle monitoring program comprising instructions executable by a processor to perform a method, the method comprising:

computing on receiving application software to be used in a vehicle a hash value of the received application software;

in a case of the computed hash value matching with a value stored in advance, installing the received application software, the installed application software being associated with design information received before the software was installed and indicating a definition content regarding dynamic behavior of the installed application software, the design information including an adverse effect level in a sense of a driver of the vehicle and at least one of an access permission, a state transition, and resources to be used related to the installed application software;

detecting, by the processor, an abnormality of the installed application software based on the at least one of the access permission, the state transition, and the resources to be used related to the installed application software of the design information received before the software was installed; and selecting, by the processor and in response to detecting the abnormality of the installed application software, an abnormality process for a measure against the abnormality from among a plurality of abnormality processes in accordance with the adverse effect level specified based on the design information received before the software was installed and associated with the installed application software, wherein the plurality of abnormality processes includes deleting the application software, and the method further includes performing the selected abnormality process from among the plurality of abnormality processes including performing the deleting the application software.

2. The recording medium according to claim 1, wherein the method further comprises:

determining whether the installed application software in which the abnormality has been detected is application software that performs output to a driver of the vehicle, and determining the adverse effect level in accordance with whether the installed application software in which the abnormality has been detected is the application software that performs the output to the driver of the vehicle.

3. The recording medium according to claim 1, wherein the method further comprises:

determining whether the installed application software in which the abnormality has been detected is audio software or car navigation software, and determining the adverse effect level in accordance with whether the installed application software in which the abnormality has been detected is the audio software or the car navigation software.

4. The recording medium according to claim 1, wherein the method further comprises:

determining whether the installed application software in which the abnormality has been detected is software capable of writing data in a storage used by a vehicle-mounted device, and determining the adverse effect level in accordance with whether the installed application software in which the abnormality has been detected is the software capable of writing data in the storage used by the vehicle-mounted device.

5. The recording medium according to claim 1, wherein the method further comprises:

determining whether the installed application software in which the abnormality has been detected is diagnosing software, and determining the adverse effect level in accordance with whether the installed application software in which the abnormality has been detected is the diagnosing software.

6. The recording medium according to claim 1, wherein for each combination of the adverse effect level and an operation mode including a first operation mode and a second operation mode, the combination is associated with a different one of the plurality of abnormality processes, and the method further comprises, when operating in the first operation mode selecting the abnormality process associated with a combination of the adverse effect level and the first operation mode, and when being incapable of executing the selected abnormality process shifting from the first operation mode to the second operation mode, and selecting and executing the abnormality process associated with a combination of the adverse effect level and the second operation mode.

7. The recording medium according to claim 6, wherein the abnormality process associated with the combination of the adverse effect level and the first operation mode is a process of reporting the abnormality to an information processing device installed outside the vehicle, and the abnormality process associated with the combination of the adverse effect level and the second operation mode is a process of reporting occurrence of the abnormality to a driver of the vehicle.

8. The recording medium according to claim 6, wherein the abnormality process associated with the combination of the adverse effect level and the second operation mode is a process for the vehicle.

9. The recording medium according to claim 6, wherein the abnormality process associated with the combination of the adverse effect level and the second operation mode is a process of outputting a notification screen for a driver of the vehicle.

10. The recording medium according to claim 9, wherein the notification screen is a screen prompting a movement of the vehicle.

11. The recording medium according to claim 9, wherein the notification screen is a screen including a route guide to a facility providing a service of coping with the abnormality of the installed application software.

12. The recording medium according to claim 9, wherein the abnormality process associated with the combination of the adverse effect level and the second operation mode is a process of further shifting from the notification screen to a notification screen indicating an execution result of the abnormality process.

13. The recording medium according to claim 6, wherein the adverse effect level is one of a plurality of different adverse effect levels, and each of the different adverse effect levels is associated with both an abnormality process for the first operation mode and a different abnormality process for the second operation mode.

14. The recording medium according to claim 13, wherein the plurality of different adverse effect levels includes three or more different adverse effect levels.

15. The recording medium according to claim 1, wherein the method further comprises, when being incapable of normally executing the selected abnormality process, not executing a different abnormality process different from the selected abnormality process.

16. The recording medium according to claim 1, wherein the plurality of abnormality processes includes downloading and executing antivirus software, and the method further includes performing the selected abnormality process from among the plurality of abnormality processes including performing the downloading and the executing antivirus software when being unable to delete the application software.

17. The recording medium according to claim 1, wherein the vehicle includes at least one actuator controlled by execution of software, and the method further includes controlling the at least one actuator by execution of the software, determining whether the installed application software in which the abnormality has been detected is the software whose execution controls the at least one actuator, and performing the selected abnormality process from among the plurality of abnormality processes including performing deleting the software whose execution controls the at least one actuator.

18. A vehicle-mounted device to be mounted in a vehicle, the vehicle-mounted device comprising:

processing circuitry configured to:

compute, on receiving application software to be used in a vehicle, a hash value of the received application software;

in a case of the computed hash value matching with a value stored in advance, install the received application software, the installed application software being associated with design information received before the software was installed and indicating a definition content regarding dynamic behavior of the installed application software, the design information including an adverse effect level in a sense of a driver of the vehicle and at least one of an access permission, a state transition, and resources to be used related to the installed application software;

detect an abnormality of the installed application software based on the at least one of the access permission, the state transition, and the resources to be used related to the installed application software of the design information received before the software was installed; and select, in response to detecting the abnormality of the installed application software, an abnormality process for a measure against the abnormality from among a plurality of abnormality processes in accordance with the adverse effect level specified based on the design information received before the software was installed and associated with the installed application software, wherein the plurality of abnormality processes includes deleting the application software, and the processing circuitry is configured to perform the selected abnormality process from among the plurality of abnormality processes including performing the deleting the application software.

19. A vehicle, comprising:

the vehicle mounted device according to claim 18, and at least one actuator controlled by execution of software, wherein the processing circuitry is configured to:

control the at least one actuator by execution of the software, determine whether the installed application software in which the abnormality has been detected is the software whose execution controls the at least one actuator, and perform the selected abnormality process from among the plurality of abnormality processes including performing deleting the software whose execution controls the at least one actuator.

20. A vehicle monitoring method for a vehicle-mounted device to be mounted in a vehicle, the vehicle monitoring method comprising:

computing, on receiving application software to be used in a vehicle, a hash value of the received application software;

in a case of the computed hash value matching with a value stored in advance, installing the received application software, the installed application software being associated with design information received before the software was installed and indicating a definition content regarding dynamic behavior of the installed application software, the design information including an adverse effect level in a sense of a driver of the vehicle and at least one of an access permission, a state transition, and resources to be used related to the installed application software;

detecting an abnormality of the installed application software based on the at least one of the access permission, the state transition, and the resources to be used related to the installed application software of the design information received before the software was installed; and selecting, in response to detecting the abnormality of the installed application software, an abnormality process for a measure against the abnormality from among a plurality of abnormality processes in accordance with the adverse effect level specified based on the design information received before the software was installed and associated with the installed application software, wherein the plurality of abnormality processes includes deleting the application software, and the method further includes performing the selected abnormality process from among the plurality of abnormality processes including performing the deleting the application software.

* * * * *